(12) United States Patent
Qin et al.

(10) Patent No.: US 9,863,486 B2
(45) Date of Patent: Jan. 9, 2018

(54) DRIVEN ACCESSORY

(71) Applicant: BorgWarner Inc., Auburn Hills, MI (US)

(72) Inventors: Shiwei Qin, Battle Creek, MI (US); James Ignatovich, Ceresco, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/268,813

(22) Filed: Sep. 19, 2016

(65) Prior Publication Data

US 2017/0009819 A1 Jan. 12, 2017

Related U.S. Application Data

(63) Continuation-in-part of application No. 14/149,664, filed on Jan. 7, 2014, now Pat. No. 9,447,826, which
(Continued)

(51) Int. Cl.
*F16D 27/115* (2006.01)
*F16D 13/76* (2006.01)
(Continued)

(52) U.S. Cl.
CPC ............ *F16D 27/112* (2013.01); *F16D 13/76* (2013.01); *B60K 25/02* (2013.01); *F01P 5/04* (2013.01);
(Continued)

(58) Field of Classification Search
None
See application file for complete search history.

(56) References Cited

U.S. PATENT DOCUMENTS 2,991,864 A 7/1961 Prachar
4,793,457 A * 12/1988 Siewert ................. F16D 27/112
192/112
(Continued)

FOREIGN PATENT DOCUMENTS

CN 1578100 A 2/2005
CN 1769731 A 5/2006
(Continued)

OTHER PUBLICATIONS

Second Office Action issued by Chinese International Patent Office in Application No. 201380065312.4.
(Continued)

*Primary Examiner* — Jacob S Scott
(74) *Attorney, Agent, or Firm* — Harness, Dickey & Pierce, P.L.C.

(57) ABSTRACT

A driven accessory that includes an input member, a cover, an output member, a clutch and a clutch actuator. The input member is rotatable about an axis and has a hub, an outer rim, and a radially extending web that couples the hub to the outer rim. The cover is coupled to the input member for common rotation about the axis and cooperates with the input member to define a clutch cavity. The clutch is received in the clutch cavity and selectively transmits rotary power between the input member and the output member. The clutch actuator is selectively operable to change the operational state in which the clutch operates. The clutch actuator has an electromagnetic coil that is disposed outside the clutch cavity. The hub is disposed along the axis between the clutch and the electromagnetic coil.

16 Claims, 5 Drawing Sheets

Related U.S. Application Data is a continuation-in-part of application No. 14/135,280, filed on Dec. 19, 2013, now Pat. No. 9,482,286, application No. 15/268,813, filed on Sep. 19, 2016, which is a continuation-in-part of application No. 14/149,694, filed on Jan. 7, 2014, now Pat. No. 9,458,897, which is a continuation-in-part of application No. 14/135,280, filed on Dec. 19, 2013, now Pat. No. 9,482,286, application No. 15/268,813, filed on Sep. 19, 2016, which is a continuation-in-part of application No. 14/149,713, filed on Jan. 7, 2014, now Pat. No. 9,453,571, which is a continuation-in-part of application No. 14/135,280, filed on Dec. 19, 2013, now Pat. No. 9,482,286.

(60) Provisional application No. 61/745,647, filed on Dec. 24, 2012.

(51) Int. Cl.
*F01P 7/08* (2006.01)
*B60K 25/02* (2006.01)
*F01P 5/12* (2006.01)
*F01P 5/04* (2006.01)
*F16D 27/112* (2006.01)

(52) U.S. Cl.
CPC ............... *F01P 5/12* (2013.01); *F01P 7/084* (2013.01); *F01P 2031/00* (2013.01)

(56) References Cited

U.S. PATENT DOCUMENTS

| | | |
|---|---|---|
| 4,958,712 A * | 9/1990 | Suganuma ............ F16D 13/52 192/113.36 |
| 5,057,728 A | 10/1991 | Dammeyer et al. |
| 5,295,812 A | 3/1994 | Steele |
| 5,396,976 A * | 3/1995 | Koitabashi ........... F16D 27/112 192/112 |
| 5,551,546 A | 9/1996 | Tabayama et al. |
| 5,984,068 A | 11/1999 | Reed, Jr. |
| 6,071,205 A | 6/2000 | Ohno et al. |
| 6,119,841 A | 9/2000 | Orlamunder |
| 6,488,133 B1 | 12/2002 | Maurice et al. |
| 6,543,396 B2 * | 4/2003 | Stretch ................. F16D 37/02 123/41.12 |
| 6,561,336 B1 | 5/2003 | Huart et al. |
| 6,868,809 B1 | 3/2005 | Robb |
| 6,974,010 B2 | 12/2005 | Machida et al. |
| RE39,795 E | 8/2007 | Wright |
| 7,267,214 B2 | 9/2007 | Bittner et al. |
| 7,841,456 B2 | 11/2010 | Pescheck et al. |
| 8,256,598 B2 | 9/2012 | Buzzard |
| 8,371,426 B2 | 2/2013 | Hoshino et al. |
| 8,678,152 B2 | 3/2014 | Kuwabara |
| 8,733,527 B2 | 5/2014 | Greene |
| 8,851,258 B2 | 10/2014 | Komorowski et al. |
| 8,978,600 B2 | 3/2015 | Shutty et al. |
| 9,004,251 B2 | 4/2015 | Ikegawa |
| 9,140,313 B2 | 9/2015 | Ikegawa |
| 9,217,476 B2 | 12/2015 | Roby |
| 9,279,460 B2 | 3/2016 | Qin |
| 2002/0108588 A1 | 8/2002 | Komorowski |
| 2003/0008741 A1 | 1/2003 | Fadler et al. |
| 2003/0029392 A1 | 2/2003 | Komorowski |
| 2003/0029393 A1 | 2/2003 | Komorowski |
| 2007/0227853 A1 | 10/2007 | Pardee |
| 2009/0047162 A1 | 2/2009 | Uchikado et al. |
| 2009/0272615 A1 | 11/2009 | Buzzard |
| 2010/0126822 A1 * | 5/2010 | Winkler ............... F16D 27/112 192/90 |
| 2012/0133465 A1 | 5/2012 | Staniewicz et al. |
| 2013/0075219 A1 | 3/2013 | Onitake et al. |
| 2013/0093547 A1 | 4/2013 | Staniewicz et al. |
| 2013/0098730 A1 | 4/2013 | Danciu et al. |
| 2013/0175134 A1 | 7/2013 | Boyes et al. |
| 2013/0187736 A1 | 7/2013 | Staniewicz et al. |
| 2013/0306005 A1 | 11/2013 | Shutty et al. |
| 2013/0313068 A1 | 11/2013 | Mevissen et al. |
| 2014/0023526 A1 | 1/2014 | Roby |
| 2014/0076683 A1 | 3/2014 | Williams |
| 2014/0141892 A1 | 5/2014 | Williams |
| 2014/0174873 A1 | 6/2014 | Qin |
| 2014/0174874 A1 | 6/2014 | Qin |
| 2014/0238809 A1 | 8/2014 | Boyes et al. |
| 2015/0075935 A1 | 3/2015 | Kitayama et al. |
| 2015/0184575 A1 | 7/2015 | Shutty et al. |
| 2015/0285365 A1 | 10/2015 | Canto Michelotti |
| 2016/0004733 A1 | 1/2016 | Cao et al. |
| 2016/0040733 A1 | 2/2016 | Staniewicz et al. |

FOREIGN PATENT DOCUMENTS

| | | |
|---|---|---|
| CN | 201721321 U | 1/2011 |
| CN | 102085801 A | 6/2011 |
| CN | 102459941 A | 5/2012 |
| WO | WO-2012/142016 A2 | 10/2012 |
| WO | WO-2013/101287 A2 | 7/2013 |
| WO | WO-2013/154848 A1 | 10/2013 |

OTHER PUBLICATIONS

International Search Report from first office action for corresponding Chinese application No. 201410636074.4, filed Nov. 5, 2014.

* cited by examiner

DRIVEN ACCESSORY

CROSS-REFERENCE TO RELATED APPLICATIONS

This application is a continuation-in-part of U.S. application Ser. No. 14/149,664 filed Jan. 7, 2014, which is a continuation-in-part of U.S. application Ser. No. 14/135,280 filed Dec. 19, 2013, which claims the benefit of U.S. Provisional Application No. 61/745,647 filed Dec. 24, 2012. This application is also a continuation-in-part of U.S. application Ser. No. 14/149,694 filed Jan. 7, 2014, which is a continuation-in-part of U.S. application Ser. No. 14/135,280 filed Dec. 19, 2013, which claims the benefit of U.S. Provisional Application No. 61/745,647 filed Dec. 24, 2012. This application is also a continuation-in-part of U.S. application Ser. No. 14/149,713 filed Jan. 7, 2014, which is a continuation-in-part of U.S. application Ser. No. 14/135,280 filed Dec. 19, 2013, which claims the benefit of U.S. Provisional Application No. 61/745,647 filed Dec. 24, 2012. Each of the above-referenced applications is incorporated by reference as if fully set forth in detail herein.

FIELD

The present disclosure relates to a driven accessory.

BACKGROUND

This section provides background information related to the present disclosure which is not necessarily prior art.

Accessories such as coolant pumps and cooling fans are in common use in modern vehicles that employ an internal combustion engine for the production of propulsive power or the generation of electricity. Such accessories are commonly driven by a belt directly or indirectly attached to the crankshaft of the engine and thus operate at a rotational speed that is related in a fixed manner to the rotational speed of the crankshaft.

It would be desirable to reduce the power that is consumed by such accessories to improve fuel economy and to reduce engine emissions. It would thus be preferable if such accessories could be made to operate with less power, or only when needed, in order to reduce the load on the engine and, in turn, improve fuel economy and reduce undesirable emissions from the engine.

SUMMARY

This section provides a general summary of the disclosure, and is not a comprehensive disclosure of its full scope or all of its features.

In one form, the present teachings provide a driven accessory that includes an input member, a cover, an output member, a clutch and a clutch actuator. The input member is rotatable about an axis and has a hub, an outer rim, and a radially extending web that couples the hub to the outer rim. The cover is coupled to the input member for common rotation about the axis and cooperates with the input member to define a clutch cavity. The output member is rotatable about the axis independently of the input member. The clutch is received in the clutch cavity and is operable in a plurality of operational states including a first operational state, in which the output member is decoupled from the input member, and a second operational state in which the output member is coupled to the input member for common rotation. The clutch actuator is selectively operable to change the operational state in which the clutch operates. The clutch actuator has an electromagnetic coil that is disposed outside the clutch cavity. The hub is disposed along the axis between the clutch and the electromagnetic coil.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is an exploded perspective top view of the driven accessory of FIG. 1;

Corresponding reference numerals indicate corresponding parts throughout the several views of the drawings.

DETAILED DESCRIPTION

Figure 1:
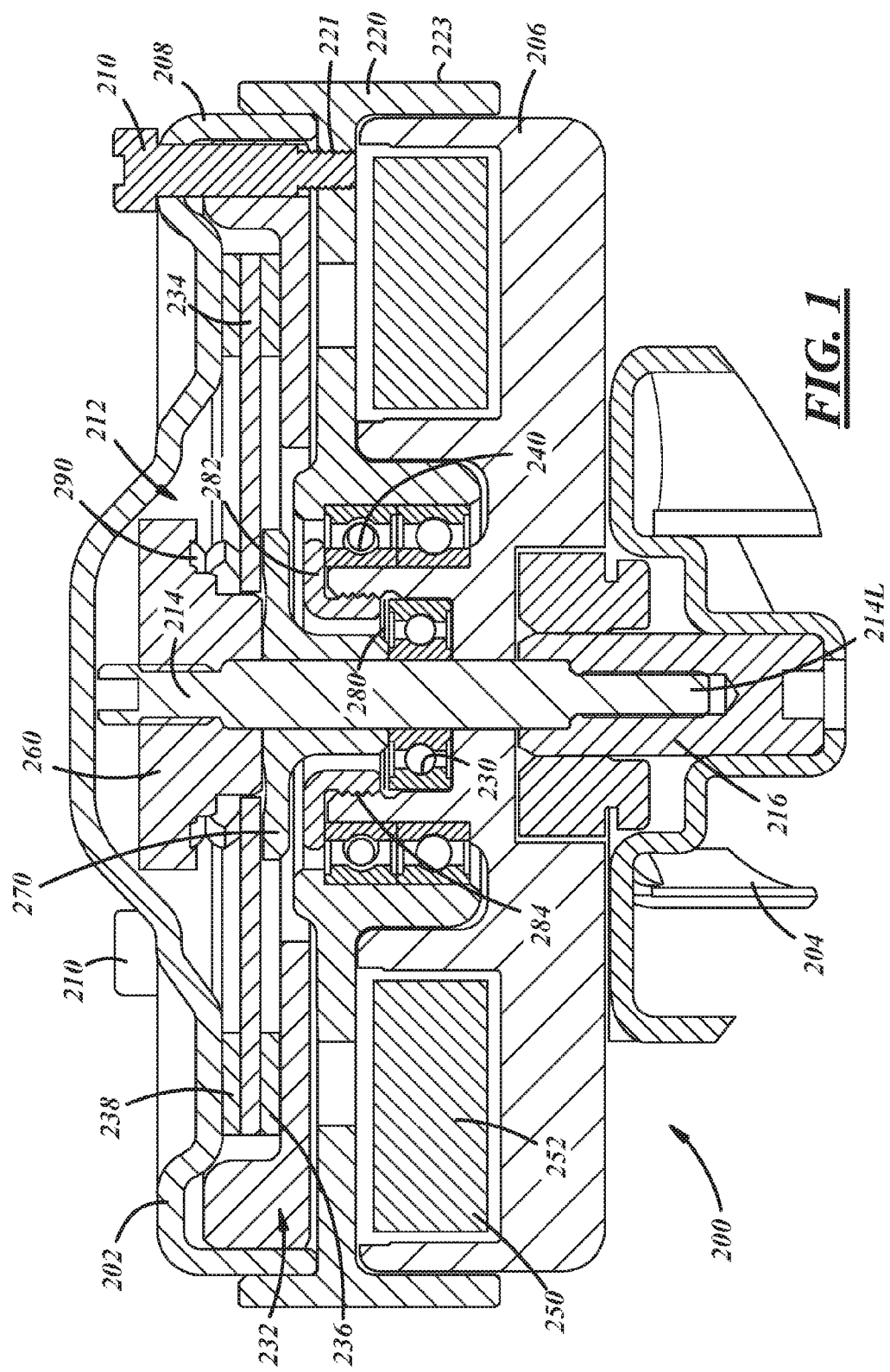
FIG. 1 is a cross-sectional view of a driven accessory constructed in accordance with the teachings of the present disclosure.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons of ordinary skill in the art to which the invention relates.

A driven accessory is shown in FIGS. 1-4 and is generally indicated by reference numeral 200. In the particular example provided, the driven accessory 200 is a coolant pump. The driven accessory 200 includes a housing 202 and an impeller 204 which is used to circulate the engine cooling fluid in the vehicle.

The housing 202 includes a base member 206 and a cover member 208, which can be secured together by a plurality of threaded fasteners 210. A solenoid actuated friction clutch assembly 212 is positioned in the housing 202. A central shaft member 214 is positioned centrally in the housing 202 and is used to rotate the impeller 204. The impeller 204 is positioned in a housing (not shown) and is connected to the shaft member 214 by a fitting assembly 216. The lower end 214L of the shaft is secured to the fitting assembly 216 in any conventional manner.

The driven accessory 200 also includes a pulley member 220. The pulley member 220 is adapted to be driven by an engine belt, either directly or indirectly by the engine crankshaft. Although the outside surface 223 of the pulley member 220 is smooth in the drawings, but it can have any conventional shape in order to mesh or mate with the engine belt.

The shaft member 214 is rotatably supported in the housing 202 by a bearing 230. Although only the bearing 230 is depicted and the bearing 230 is depicted with a single row of bearing elements, it will be appreciated that the bearing 230 can have more than one rows of bearing elements or can comprise stacked bearings.

The friction clutch assembly 212 includes an armature plate 232, a friction plate 234 and two friction members 236, 238 that can be formed as annular rings from a friction material. The armature plate 232 is preferably made of a magnetically-susceptible material, such as low carbon steel. The friction plate 234 is preferably made of a non-magnetically susceptible material, such as stainless steel.

The friction members 236, 238 can be formed from any conventional friction material used in friction clutches today, and can be formed as complete rings, segments of rings, or simply pieces of friction material positioned generally where the friction members 236, 238 are shown in the drawings. The friction members 236, 238 are fixedly attached to the two sides of the friction plate 234 by, for example, bonding using a bonding agent.

The cover member 208 which preferably is made of a non-magnetically susceptible material, such as stainless steel, is connected directly to the pulley member 220. In the example provided, the fasteners 210 fixedly couple the cover member 208 to the pulley member 220. The ends of the fasteners can be threaded for mating with corresponding mating threads in openings 221 in the pulley member 220. Thus, when the pulley member 220 is rotated by an engine belt (not shown); the cover member 208 rotates at the same speed.

The pulley member 220 is preferably made of a magnetically susceptible material, such as low carbon steel. The pulley member 220 rotates freely around bearings 240. Although the bearings 240 can be of any type that will have sufficient durability and performance, a pair of stacked bearings 240 can be utilized, as shown in the drawings.

The operation of the friction clutch assembly 212 is performed by a solenoid assembly 250. The solenoid assembly 250 includes a solenoid coil 252 that is positioned in the base member 206 of the housing 202. The solenoid coil 252 comprises a donut-shaped coil of copper wires, while the base member 206 is preferably made of a magnetically susceptible material, such as low carbon steel. The solenoid coil 252 is preferably potted in the base member 206.

Figure 2:
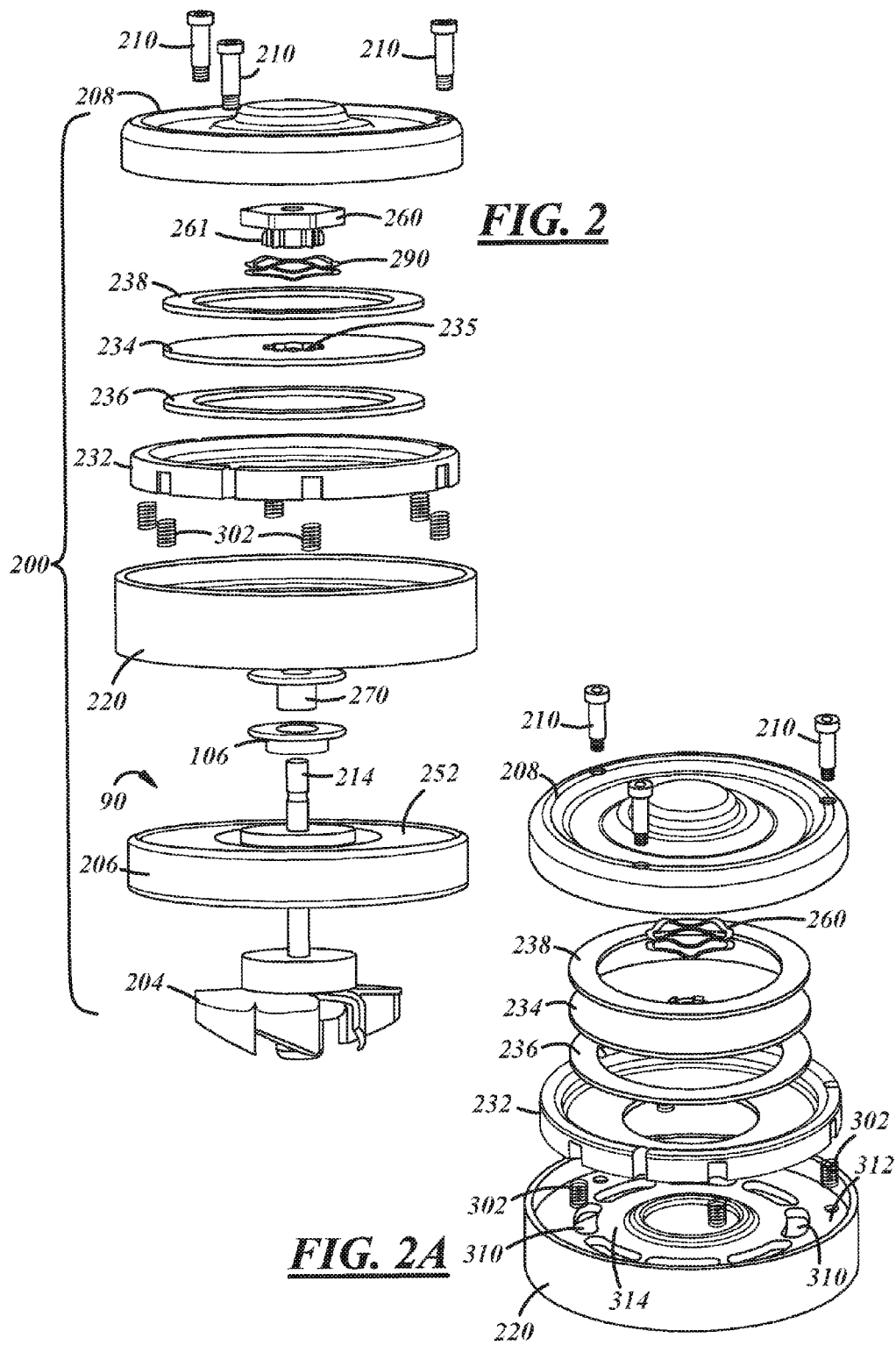
FIG. 2 is an exploded perspective side view of the driven accessory of FIG. 1.

A nut member 260 is threaded, or otherwise firmly fixed, on the end of the shaft member 214. The friction plate 234 is connected, such as being keyed, to the nut member 260. As shown in FIG. 2, the nut member 260 has a plurality of spline members 261 which fit within corresponding notches 235 in the center of the friction plate 234. In this manner, the nut member 260 and friction plate 234 rotate with the shaft member 214. The nut member 260 and the shaft member 214 firmly clamp a stop member 270 and the bearing 230 together. The shaft member 214 and all components fixed on it are positioned axially by the bearing 230. The stop member 270 is preferably made of a non-metallically susceptible material, such as stainless steel.

To fix the bearing 230 in an axial position inside the base member 206, a wave spring member 280 and bearing retainer member 282 are utilized. The bearing retainer member 282 is threaded to the base member 206 as shown by reference number 284.

The stop member 270 is utilized to stop the axial movement of the friction plate 234 when the solenoid assembly 250 is energized, as explained below. A return spring 290 is positioned between the nut member 260 and the friction plate 234 and acts to return the friction plate 234 to its mechanical disengaged position when the solenoid assembly 250 is actuated.

The solenoid coil 252 is electrically powered through a controller (not shown) that can comprise a circuit board (not shown). Electrical leads and wires (not shown) can be insert molded in the base member 206 in order to carry the electrical signals to the solenoid coil 252. The controller further communicates with the electronic control unit (ECU) of the vehicle through the vehicle communication network such as a CAN network. The controller could also be positioned inside the base member 206, possibly having a donut shape.

The driven accessory 200 is selectively operated according to the cooling required for the engine. Sensors feed relevant data to the ECU which then sends a signal to the controller requesting that the driven accessory 200 be operated. The controller controls engagement of the friction clutch assembly 212 to cause the impeller 204 to be driven by the pulley member 220.

Figure 4:
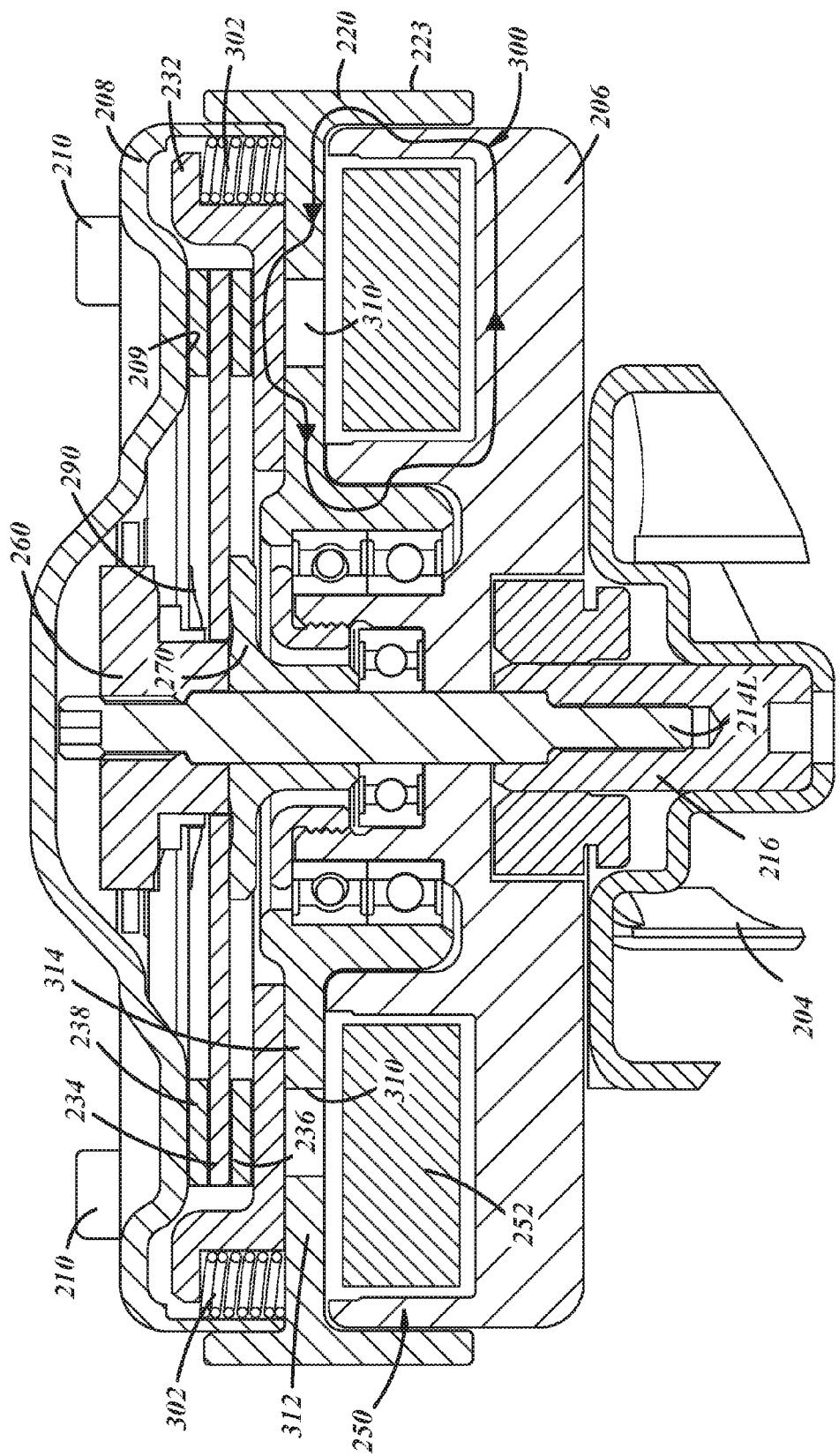
FIG. 4 is a view similar to that of FIG. 1 but illustrating a solenoid in an energized condition and a clutch in a disengaged state.

When operation of the driven accessory 200 is not required, the friction clutch assembly 212 is held in a disengaged position by the solenoid assembly 250. This is shown in FIG. 4. When the solenoid coil 252 is electrically activated, a flux circuit 300 is created which acts to pull the armature plate 232 toward the solenoid coil 252 overcoming the force of the coil springs 302. With the armature plate 232 pulled toward the solenoid coil 252, the return spring 290 holds the friction plate 234 against the stop member 270. In this condition, the friction members 236, 238 on the friction plate 234 are not in contact with either the cover member 208 or the armature plate 232.

The number of coil springs 302 and their biasing force is determined according to the force needed in the assembly. Six coil springs 302 are shown in the drawings, but there can be more or less than this amount depending on the force needed.

In this deactivation mode of operation, there are air gaps on the exterior sides of the friction materials on the friction plate 234, and the input (pulley member 220) and output (shaft member 214) are disconnected. This eliminates any interaction, such as bearing drag between the input and output.

In order to create an appropriate flux circuit 300, the pulley member 220 has a plurality of openings 310 which create air gaps. This is particularly shown in FIG. 2A, as well as FIG. 4. The openings 310 essentially form an annular open ring. With the air gaps, the pulley member 220 is, for electromagnetic purposes, essentially an outer annular ring 312 and a separated annular inner ring 314. The size, shape and number of openings or slots 310 are not critical, so long as they fulfill the purposes of creating a break in the magnetic flux. If desired, the openings can be closed by a non-magnetically susceptible material that permits the transmission of a magnetic field there through. For example, a plastic material can be fixedly coupled to the pulley member 220 to close the openings 310. Configuration in this manner closes the cavity that is formed between the pulley member 220 and the cover member 208 so that dirt, debris and moisture does not enter into the cavity, which could deleteriously affect the operation of the friction clutch assembly 212 in some situations.

The flux circuit 300 is shown in FIG. 4. The flux circuit 300 runs through the base member 206, the belt engaging portion 223 of the pulley member 220, outer annular ring portion 312 of the pulley member 220, and then jumps to the armature plate 232 and then back to the inner annular ring portion 314 of the pulley member 220 where it returns to the base member 206. This circuit pulls the armature plate 232 tightly against the pulley member 220 such that the armature plate 232 rotates with the pulley member 220 and at the same speed. In this condition, the return spring 290 is able to urge the friction plate 234 away from the cover member 208 so that the coolant pump impeller 204 is not activated (i.e., neither the friction plate 234 nor the coolant pump impeller 204 are driven).

Figure 3:
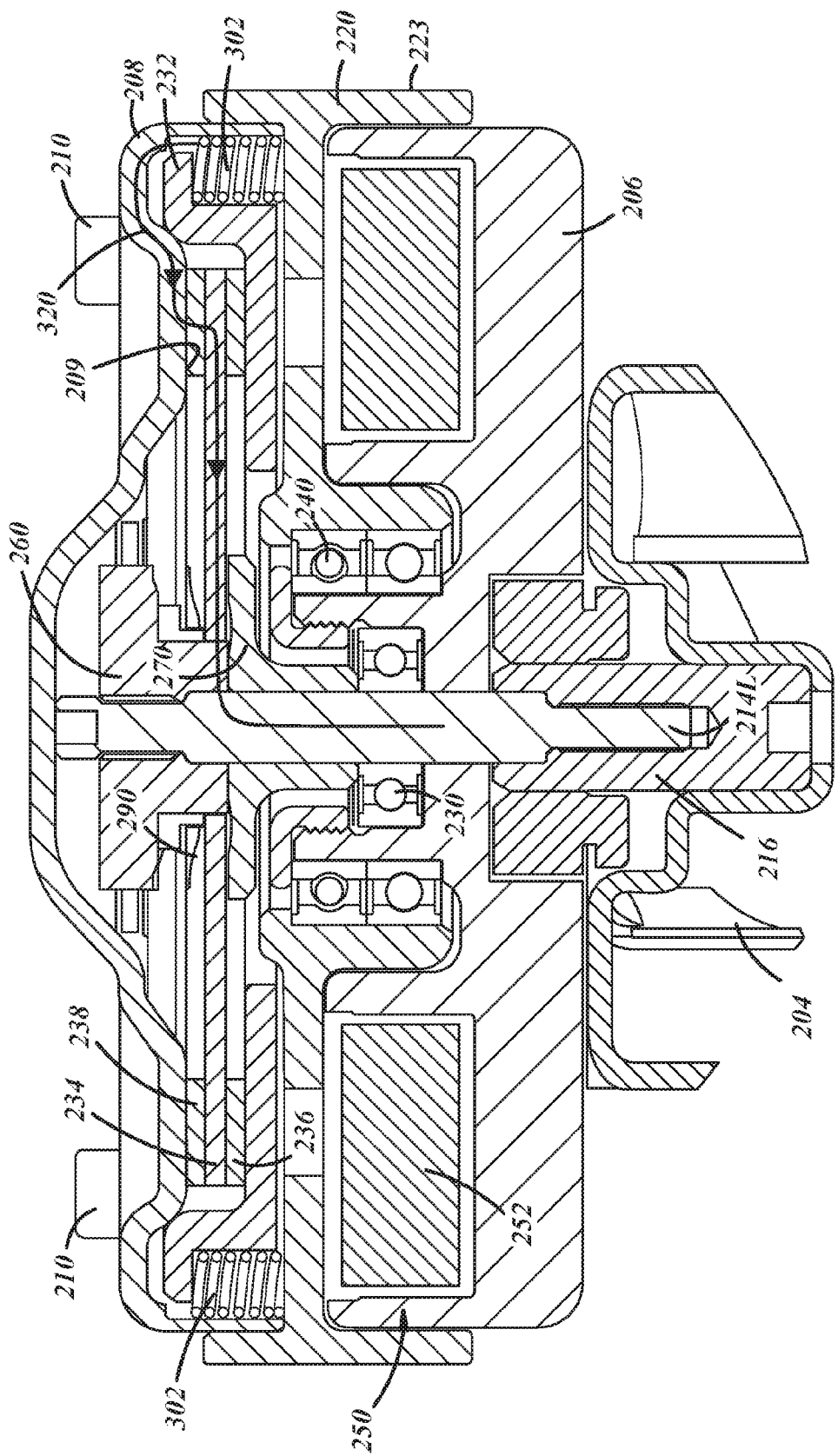
FIG. 3 is a view similar to that of FIG. 1 but illustrating a solenoid in an unenergized condition and a clutch in an engaged state.

FIG. 3 depicts the situation where the solenoid assembly 250 is not activated. This is the "fail safe" condition in which the driven accessory 200 is configured to be driven by an engine belt and so that the impeller 204 is driven. In this situation, coil springs 302 force the armature plate 232 in a direction away from the pulley member 220 and away from the solenoid assembly 250. This causes the armature plate 232 to contact the friction member 236 which in turn forces the friction member 238 to contact the inner surface 209 of the cover member 208. Since the armature plate 232, the pulley member 220 and cover member 208 are all fixed together; this causes the shaft member 214 and impeller 204 to rotate at the same speed.

A path of torque transfer which mechanically rotates the shaft member 214 is shown by arrows 320 in FIG. 3. When the friction clutch assembly 212 is in an engaged state, the friction plate 234 is clamped between the cover member 208 and armature plate 232 and torque is transferred through both sides of the friction plate 234. There also is a torque transfer path from the pulley member 220, through the fastener 210, the armature plate 232, the friction plate 234, the nut member 260 and to the shaft member 214.

Figure 5:
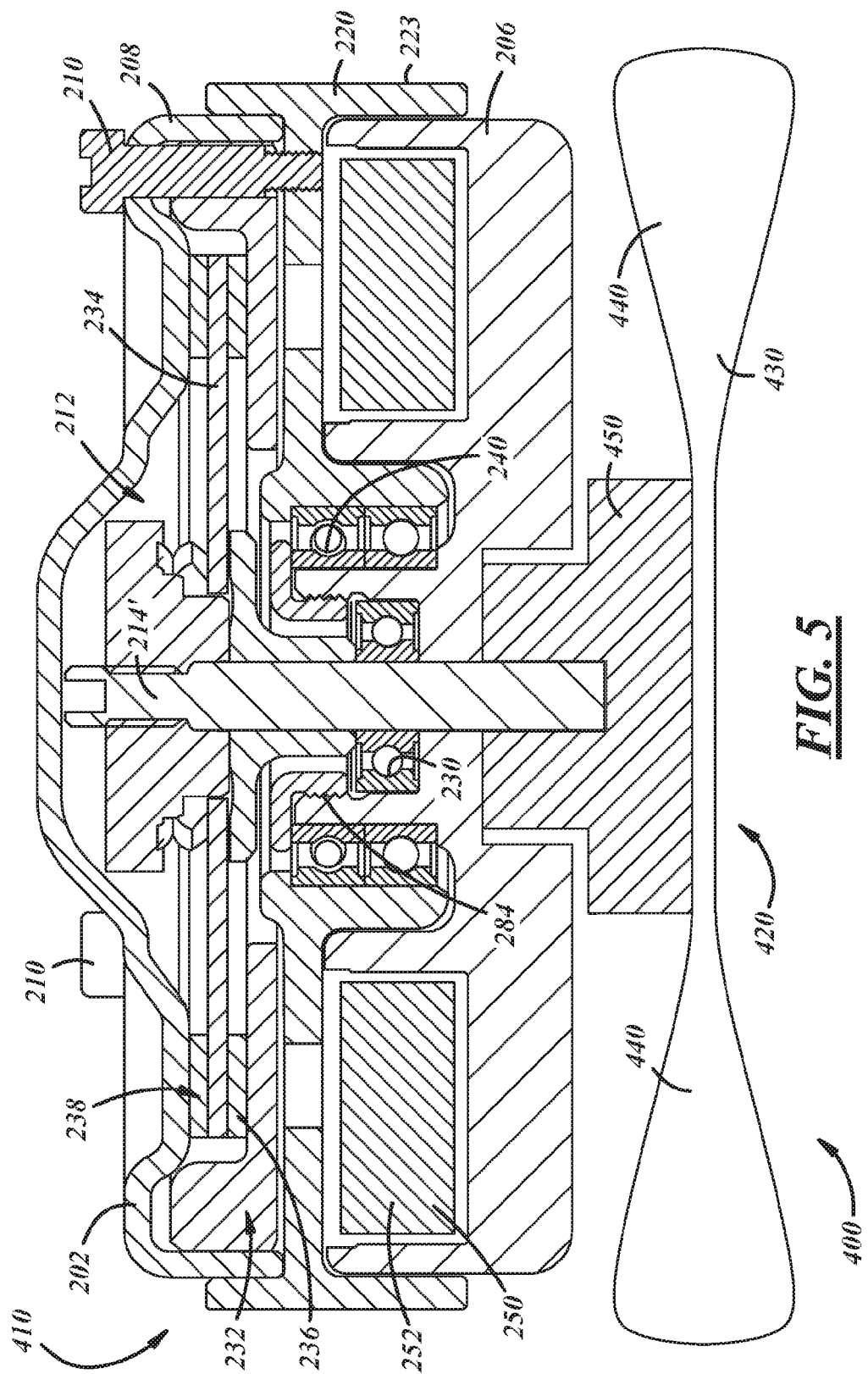
FIG. 5 is a cross-sectional view of another driven accessory constructed in accordance with the teachings of the present disclosure.

FIG. 5 schematically depicts the use of the inventive friction clutch for operating a fan mechanism. The fan mechanism is referred to generally by the reference numeral 400.

The friction clutch mechanism 410 is substantially the same as the friction clutch mechanism described above which is utilized to selectively rotate a coolant pump impeller. In this embodiment, the friction clutch mechanism is utilized to rotate a cooling fan. The components which are the same are referred to by the same reference numerals as set forth in the other Figures. The main differences are that the shaft member 214', when activated, rotates a cooling fan assembly 420. The fan assembly 420 includes a cooling fan 430 with a number of blade members 440 and central hub member 450. The hub member 450 is securely attached to the shaft member 214', and the fan 430 is securely attached to the hub member 450, such that the housing fan and blades will rotate when the shaft member rotates and at the same speed. Any conventional means or mechanisms can be utilized to attach the components together so they all rotate together.

The present coolant pump and cooling fan devices are designed to be spring engaged so the accessory device is powered in the event of a control failure such as a loss of electrical power. This is done to provide "Fail-Safe" functionality meaning that the device defaults to its "on" state when it is not powered. If the electrical system of the coolant pump were to fail, the solenoid would be de-energized allowing the coil springs to force the friction clutch assembly to become engaged. Therefore the pump would operate in mechanical mode with the impeller driven by the pulley member through the clutch assembly, thus preventing overheating.

Although the invention has been described with respect to preferred embodiments, it is to be also understood that it is not to be so limited since changes and modifications can be made therein which are within the full scope of this invention as detailed by the following claims.

What is claimed is:

1. A driven accessory comprising:
   an input member having a hub, an outer rim, and a radially extending web that couples the hub to the outer rim, the input member being rotatable about an axis;
   a cover coupled to the input member for common rotation about the axis, the cover cooperating with the input member to define a clutch cavity;
   an output member that is rotatable about the axis independently of the input member;
   a clutch received in the clutch cavity, the clutch being operable in a plurality of operational states including a first operational state, in which the output member is decoupled from the input member, and a second operational state in which the output member is coupled to the input member for common rotation;
   a clutch actuator that is selectively operable to change the operational state in which the clutch operates, the clutch actuator having an electromagnetic coil that is disposed outside the clutch cavity, wherein the hub is disposed along the axis between the clutch and the electromagnetic coil;
   a housing; and
   first and second bearings that are mounted coaxially to the housing, the first bearing supporting the input member for rotation relative to the housing, the second bearing supporting the output member for rotation relative to the housing.

2. The driven accessory of claim 1, wherein the clutch is a friction clutch.

3. The driven accessory of claim 2, wherein the friction clutch comprises a friction plate that is movable along the axis between a first plate position and a second plate position, and wherein the driven accessory further comprises a return spring that is configured to bias the friction plate toward one of the first and second plate positions.

4. The driven accessory of claim 3, wherein the return spring biases the friction plate away from the cover.

5. The driven accessory of claim 1, wherein the electromagnetic coil is configured to produce a magnetic field and wherein the hub of the input member defines a plurality of apertures that are configured to permit transmission of the magnetic field there through.

6. The driven accessory of claim 5, wherein a magnetically non-susceptible material closes the apertures in the hub, the magnetically non-susceptible material being configured to close the apertures but to permit the magnetic field to be transmitted there through.

7. The driven accessory of claim 1, wherein the clutch actuator comprises an armature that is disposed in the clutch cavity.

8. The driven accessory of claim 6, wherein the armature is non-rotatably coupled to the input member.

9. The driven accessory of claim 8, further comprising a spring that biases the armature along the axis relative to the hub of the input member.

10. The driven accessory of claim 9, wherein the spring comprises a plurality of helical coil springs that are disposed about a circumference of the armature.

11. The driven accessory of claim 10, wherein each of the helical coil springs is received into a pocket formed in the armature.

12. The driven accessory of claim 9, wherein the spring biases the armature away from the hub.

13. The driven accessory of claim 1, wherein the electromagnetic coil is mounted to the housing.

14. The driven accessory of claim 1, further comprising a work element coupled to the output member.

15. The driven accessory of claim 14, wherein the work element is a fan or an impeller.

16. The driven accessory of claim 1, wherein the input member is a pulley.

* * * * *